(12) United States Patent
Wu et al.

(10) Patent No.: US 8,431,220 B2
(45) Date of Patent: *Apr. 30, 2013

(54) HYDROPHOBIC COATINGS AND THEIR PROCESSES

(75) Inventors: Jin Wu, Webster, NY (US); Lanhui Zhang, Webster, NY (US); Lin Ma, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 393 days.

This patent is subject to a terminal disclaimer.

(21) Appl. No.: 12/479,057

(22) Filed: Jun. 5, 2009

(65) Prior Publication Data

US 2010/0310774 A1   Dec. 9, 2010

(51) Int. Cl.
*B32B 25/02* (2006.01)
*B32B 27/20* (2006.01)
*B32B 33/00* (2006.01)
*B05D 3/00* (2006.01)
*C09D 5/00* (2006.01)

(52) U.S. Cl.
USPC ..... 428/331; 427/385.5; 427/387; 427/388.1; 427/393.5; 427/397.7; 428/323; 428/403; 428/404; 428/405; 428/421; 428/422

(58) Field of Classification Search .......... None
See application file for complete search history.

(56) References Cited

U.S. PATENT DOCUMENTS

| | | | | |
|---|---|---|---|---|
| 5,700,861 A | * | 12/1997 | Tomihashi et al. | 524/344 |
| 2006/0167138 A1 | * | 7/2006 | Ishii et al. | 523/200 |
| 2010/0311572 A1 | * | 12/2010 | Seeber et al. | 502/159 |

FOREIGN PATENT DOCUMENTS

| | | | |
|---|---|---|---|
| EP | 1106657 | | 6/2001 |
| EP | 1162239 | | 12/2001 |
| GB | 1109369 | | 4/1968 |
| JP | 11115117 A | * | 4/1999 |
| JP | 2000212360 | | 8/2000 |
| JP | 2007162029 A | * | 6/2007 |
| WO | 03104319 | | 12/2003 |
| WO | WO 2009027432 A1 | * | 3/2009 |

OTHER PUBLICATIONS

Machine translation of JP 11115117 A, provided by the JPO website (no date).*
Machine translation of JP 2007162029 A, provided by the JPO website (no date).*
European Patent Office, European Search Report, European Patent Application No. 10164257.7; Aug. 19, 2010, 5 Pages.

* cited by examiner

*Primary Examiner* — Michael J Feely
(74) *Attorney, Agent, or Firm* — MH2 Technology Law Group LLP

(57) ABSTRACT

Exemplary embodiments provide materials and methods for hydrophobic coatings that can include hydrophobic core-shell nano-fillers dispersed in an elastomeric polymer matrix.

20 Claims, 2 Drawing Sheets

HYDROPHOBIC COATINGS AND THEIR PROCESSES

DETAILED DESCRIPTION

1. Field of Use

The present teachings relate generally to composite coatings and, more particularly, to hydrophobic coatings and methods for their formation.

2. Background

Water-repelling hydrophobic surfaces and their production have huge opportunities in the area of corrosion inhibition for metal components, in the area of chemical and biological agent protection for clothing, and for many other applications.

With higher hydrophobicity, super-hydrophobic surfaces and coatings possess so called "lotus leaf effect" with unique properties, such as anti-contamination, anti-sticking, and self-cleaning. These properties are desirable for many applications including anti-biofouling paints for boats, anti-sticking of snow for antennas and windows, self-cleaning windshields for automobiles, metal refining, stain resistant textiles, anti-soiling architectural coatings, etc.

Filler materials are often used for the fabrication of hydrophobic or super-hydrophobic surfaces and coatings. For example, carbon nanotubes are of great interest to be used as filler materials due to their remarkable mechanical properties, as well as other unique properties such as electrical conductivity and chemical resistance.

Other filler materials, however, may also be desirable to be incorporated into composite coating materials so as to provide hydrophobic and/or super-hydrophobic properties.

SUMMARY

According to various embodiments, the present teachings include a hydrophobic coating. The hydrophobic coating can include a polymer matrix having an elastomeric polymer and a plurality of nano-fillers dispersed within the polymer matrix In embodiments, the nano-filler can include a core-shell structure having a silica shell over a metal oxide core, wherein the silica shell can include one or more hydrophobic moieties.

According to various embodiments, the present teachings also include a super-hydrophobic coating. The super-hydrophobic coating can include a plurality of nano-fillers dispersed within a fluoroelastomer matrix in an amount to render the fluoroelastomer matrix super-hydrophobic having a water contact angle of about 150° C. or higher. Specifically, the fluoroelastomer matrix can include one or more fluoroelastomers, and the nano-filler can include a core-shell structure having a silica shell over a metal oxide core. The silica shell can further include one or more hydrophobic moieties.

According to various embodiments, the present teachings further include a method for making a coating material. In this method, a coating composition including an elastomeric polymer and a plurality of nano-fillers dispersed in an organic solvent can first be formed, then be applied to a substrate and then be solidified to form a hydrophobic coating. The formed hydrophobic coating can thus include nano-fillers each having a silica shell over a metal oxide core, wherein the silica shell can include one or more hydrophobic moieties.

Additional objects and advantages of the present teachings will be set forth in part in the description which follows, and in part will be obvious from the description, or may be learned by practice of the present teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for hydrophobic coatings. The hydrophobic coating can include nano-fillers dispersed in a polymer matrix that includes one or more elastomeric polymers. The nano-filler can include a core-shell structure having a silica shell over a metal oxide core. The silica shell can include one or more hydrophobic moieties attached thereto. Exemplary methods for forming the hydrophobic coating can include applying a coating composition to a substrate. The disclosed hydrophobic coating can have an improved surface hydrophobicity, mechanical robustness, and/or electrical conductivity due to the incorporation of the core-shell nano-fillers.

Figure 1:
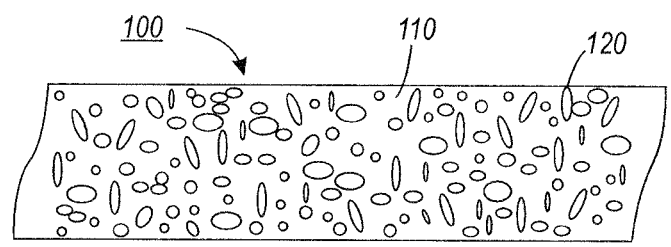
FIG. 1 schematically depicts a portion of an exemplary hydrophobic coating in accordance with various embodiments of the present teachings.

FIG. 1 depicts a portion of an exemplary hydrophobic coating 100 in accordance with various embodiments of the present teachings. It should be readily apparent to one of ordinary skill in the art that the coating 100 depicted in FIG. 1 represents a generalized schematic illustration and that other components/fillers/particles can be added or existing components/fillers/particles can be removed or modified.

As used herein, the term "hydrophobic coating" refers to a coating that has a surface wettability with a water contact angle of approximately 90 degree or greater. Typically, on a hydrophobic surface, for example, a 2-mm-diameter water drop beads up but does not run off the surface when the surface is tilted moderately. As the surface is tilted, the wetting angle at the downhill side of the droplet increases, while the wetting angle at the uphill side of the droplet decreases. Since the advancing (downhill) interface has a hard time pushing forward onto the next increment of solid surface, and the receding (uphill) interface has a hard time letting go of its bit of solid surface, the droplet tends to remain stationary or pinned in place. A hydrophobic surface is described as having a large hysteresis between advancing and receding contact angles (typically 20 degrees or more).

As shown in FIG. 1, the exemplary hydrophobic coating 100 can include a plurality of nano-fillers 120 dispersed within a polymer matrix 110.

As used herein and unless otherwise specified, the term "nano-filler" refers to a filler material that contains a core-shell structure of a silica shell over or surrounding a metal oxide core. The nano-fillers 120 of FIG. 1 can thus be core-shell nano-fillers. In embodiments, the silica shell of the "nano-fillers" can include hydrophobic moieties. The "nano-fillers" 120 can thus be hydrophobic nano-fillers.

In various embodiments, the nano-filler 120 can have a size, for example, from about 1 nm to about 1000 nm (1 micron). In various embodiments, the nano-filler 120 can have a size ranging from about 1 nm to about 100 nm, or from about 20 nm to about 50 nm. It should be noted that size ranges can vary depending on a particular use or configuration of a particular application.

As used herein, average particle size refers to the average size of any characteristic dimension of a nano-filler based on the shape of the filler particle, e.g., the median grain size by weight ($d_{50}$) as known to one of ordinary skill in the art. For example, the average particle size can be given in terms of the diameter of substantially spherical nano-fillers or nominal diameter for irregular shaped particles.

Further, the shape of the particles is not limited in any manner. In various embodiments, the nano-fillers 120 can be in a form of, for example, nanospheres, nanotubes, nanofibers, nanoshafts, nanopillars, nanowires, nanorods, nanoneedles, nanowhiskers, and/or their various functionalized and derivatized fibril forms, which include nanofibers with exemplary forms of thread, yarn, fabrics, etc. Such nano-fillers 120 can take a variety of cross-sectional shapes including round, oblong, square, euhedral, etc. within the same or different polymer matrices.

Figure 1A:
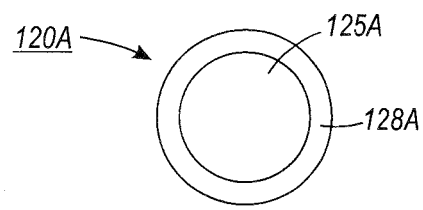
FIGS. 1A-1B schematically depict exemplary nano-fillers in accordance with various embodiments of the present teachings.
Figure 1B:
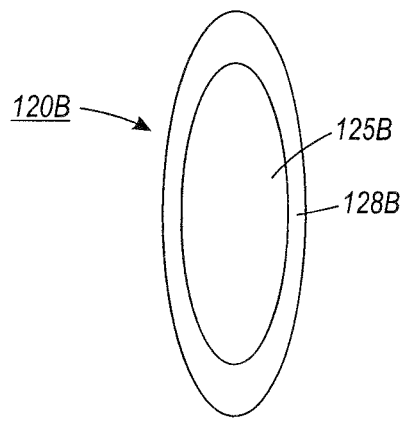

FIGS. 1A-1B further depict exemplary cross-sections for the disclosed nano-fillers 120a-b used for the hydrophobic coating 100 of FIG. 1 in accordance with various embodiments of the present teachings. As shown, the nano-filler 120a/b can include a silica shell 128a/b surrounding a metal oxide core 125a/b.

The silica shell 128, 128a/b can be made of, for example, silica ($SiO_2$), silicone ($R_2SiO$), and/or polyhedral oligomeric silsequioxane (POSS, $RSiO_{1.5}$), where R is an alkyl having from about 1 to about 18 carbon atoms, or from about 4 to about 8 carbon atoms, or an aryl having from about 6 to about 24 carbon atoms, or from about 6 to about 16 carbon atoms. The silica shell 128, 128a/b can be present in an amount of from about 5 to about 40 percent by weight of the total nano-filler 120, in some cases, from about 10 to about 30 percent by weight, or from about 15 to about 20 percent by weight of the nano-filler 120, 120a/b.

Generally, silica is hydrophilic due to silanol (>Si—OH) groups on the surface. These silanol groups may be chemically reacted with various reagents to render the silica hydrophobic. For example, the silica shell 128 of the nano-filler 120 shown in FIGS. 1-1B can be chemically active and can be covalently modified with hydrophobic moieties including, but not limited to, silazane, fluorosilane, polysiloxane, alkyl or combinations thereof.

Specific silazane examples can include hexamethyldisilazane[1,1,1-trimethyl-N-(trimethylsilyl)-silanamine], 2,2,4,4,6,6-hexamethylcyclotrisilazane, 1,3-diethyl-1,1,3,3-tetramethyldisilazane, 1,1,3,3-tetramethyl-1,3-diphenyldisilazane, and/or 1,3-dimethyl-1,1,3,3-tetraphenyldisilazane, represented by the following structures/formulas:

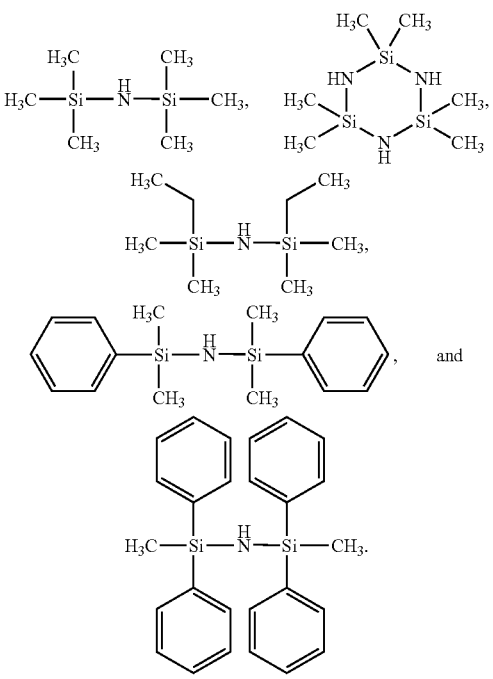

Specific fluorosilane examples can include $C_6F_{13}CH_2CH_2OSi(OCH_3)_3$, $C_8H_{17}CH_2CH_2OSi(OC_2H_5)_3$ or mixtures thereof.

Specific polysiloxane examples can include 2,4,6,8-tetramethylcyclotetrasiloxane, 2,4,6,8,10-pentamethylcyclopentasiloxane, octamethylcyclotetrasiloxane, decamethylcyclopentasiloxane, 2,4,6-trimethyl-2,4,6-triphenylcyclotrisiloxane, hexaphenylcyclotrisiloxane, octaphenylcyclotetrasiloxane, or mixtures thereof.

In embodiments, the silica shell 128 shown in FIGS. 1-1B can also be physically bonded with hydrophobic moieties through, for example, ionic bonds, hydrogen bonds, or Van der Walls bonds.

The metal oxide core 125a/b can include a metal oxide including, but not limited to, titanium oxide, aluminum oxide, cerium oxide, zinc oxide, tin oxide, aluminum doped zinc oxide, antimony doped titanium dioxide, antimony doped tin oxide, indium oxide, indium tin oxide, similar doped oxides, and/or other suitable known oxides in an amount of, for example, from about 60 to about 95 percent by weight, from about 70 to about 90 percent by weight, or from about 80 to about 85 percent by weight of the nano-filler 120, 120a/b.

In various embodiments, the core-shell nano-fillers 120 can be commercially available, for example, from EVONIK Industries (Frankfurt, Germany). Examples of commercially available nano-fillers can include, e.g., product VP STX801 from EVONIK Industries having a B.E.T. surface area of about 40 to about 70 m$^2$/g, possessing 85% of titanium dioxide core and 15% of silica shell, which is hydrophobically modified with 1,1,1-trimethyl-N-(trimethylsilyl)-silanamine.

In various embodiments, the hydrophobic coating 100 can include the core-shell nano-fillers 120 in an amount ranging from about 1 to about 80 percent by weight of the total coating. In an additional example, the core-shell nano-fillers 120 can be present in an amount from about 20 to about 70 percent by weight of the hydrophobic coating 100, or in some cases, in an amount from about 30 to about 60 percent by weight of the total coating.

Referring back to FIG. 1, the hydrophobic coatings 100 can also include a polymer matrix that includes one or more elastomeric polymers, such as, for example, fluoroelastomers, thermoelastomers, polyperfluoroether elastomers, silicone elastomers, or other cross-linked materials. In various embodiments, the one or more cross-linked polymers can be semi-soft and/or molten to mix with the nano-fillers.

In various embodiments, the polymer matrix 110 can include a cure site monomer (a curing agent) and a fluoroelastomer, e.g., having a monomeric repeat unit selected from the group consisting of tetrafluoroethylene, perfluoro(methyl vinyl ether), perfluoro(propyl vinyl ether), perfluoro(ethyl vinyl ether), vinylidene fluoride, hexafluoropropylene, and mixtures thereof.

In embodiments, the fluoroelastomers for the polymer matrix 110 can include, for example, i) copolymers of vinylidene fluoride and hexafluoropropylene; ii) terpolymers of vinylidene fluoride, hexafluoropropylene and tetrafluoroethylene; and iii) tetrapolymers of vinylidene fluoride, hexafluoropropylene, tetrafluoroethylene and a cure site monomer.

Commercially available fluoroelastomers can include, such as, for example, VITON® A (copolymers of hexafluoropropylene (HFP) and vinylidene fluoride (VDF or VF2)), VITON® B, (terpolymers of tetrafluoroethylene (TFE), vinylidene fluoride (VDF) and hexafluoropropylene (HFP)), and VITON® GF, (tetrapolymers of TFE, VF2, HFP and a cure site monomer), as well as VITON® E, VITON® E 60C, VITON® E 45, VITON® E430, VITON® B910, VITON® B50, VITON® GH and VITON® GF. The VITON® designations are Trademarks of E.I. DuPont de Nemours, Inc. (Wilmington, Del.).

Other commercially available fluoroelastomers can include, for example, DYNEON™ fluoroelastomers, and AFLAS® (i.e., poly(propylene-tetrafluoroethylene) available from 3M Company (Two Harbors, Minn.), as well as the Tecnoflons identified as For-60KIR®, For-LHF®, NM®, For-THF®, For-TFS®, TH®, and TN505®, available from Solvay Solexis (Bollate, MI, Italy).

In one embodiment, the polymer matrix 110 can include a vinylidene fluoride-containing fluoroelastomer cross-linked with an effective curing agent that incudes, but is not limited to, a bisphenol compound, a diamino compound, an aminophenol compound, an amino-siloxane compound, an amino-silane, a phenol-silane compound or their combinations. An exemplary bisphenol curing agent can include VITON® Curative No. 50 (VC-50) available from E.I. du Pont de Nemours, Inc. Curative VC-50 can contain Bisphenol-AF as a cross-linker and diphenylbenzylphosphonium chloride as an accelerator. Bisphenol-AF is also known as 4,4'-(hexafluoroisopropylidene)diphenol.

In a specific embodiment, the polymer matrix can include VITON-GF® (E.I. du Pont de Nemours, Inc.) including 35 mole percent of vinylidene fluoride (VF2), 34 mole percent of hexafluoropropylene (HFP), and 29 mole percent of tetrafluoroethylene (TFE) with 2 percent of a cure site monomer. The cure site monomer can be, for example, 4-bromoperfluorobutene-1,1,1-dihydro-4-bromoperfluorobutene-1,3-bromoperfluoropropene-1,1,1-dihydro-3-bromoperfluoropropene-1, also available from E.I. DuPont de Nemours, Inc. (Wilmington, Del.).

In various embodiments, the hydrophobic coating 100 can further include other fillers (not illustrated), such as inorganic particles within the disclosed polymer matrix. In various embodiments, the inorganic particles can be selected from the group consisting of metal oxides, non-metal oxides, and metals. Specifically, the metal oxides can include, for example, silicon oxide, aluminum oxide, chromium oxide, zirconium oxide, zinc oxide, tin oxide, iron oxide, magnesium oxide, manganese oxide, nickel oxide, copper oxide, antimony pentoxide, and indium tin oxide. The non-metal oxides can include, for example, boron nitride, and silicon carbides (SiC). The metals can include, for example, nickel, copper, silver, gold, zinc, and iron. In various embodiments, other additives known to one of ordinary skill in the art can also be included in the diamond-containing coating composites.

In various embodiments, the incorporation of the disclosed nano-fillers 120 can render the polymer matrix 110 desired properties, including surface hydrophobicity, mechanical robustness, electrical conductivity, etc.

While not intending to be bound by any particular theory, it is believed that the incorporation of the hydrophobic core-shell nano-fillers can create a certain surface morphology and render the formed coating material hydrophobic. In addition, the hydrophobic core-shell nano-fillers can lower surface tension of the fillers within the composite coating materials.

As compared with a polymer matrix only (e.g., VITON® only) without incorporating the disclosed nano-fillers, the disclosed coating materials can have a more hydrophobic surface, for example, having a water contact angle of about 105 degrees or greater, or in some cases, ranging from about 105 degrees to about 150 degrees. In specific embodiments, the hydrophobic coating materials can be super-hydrophobic having a water contact angle of at least about 150 degrees.

In various exemplary embodiments, the core-shell nano-fillers 120 can be present in the hydrophobic coating 100 in an amount of at least 30 percent by weight of the total coating, such that the hydrophobic coating 100 can be super-hydrophobic to have a water contact angle of at least about 150 degrees.

In various embodiments, the hydrophobic coating 100 can have an improved mechanical property such as an improved hardness as compared with the polymer matrix 110 only (e.g., VITON® only) with no nano-fillers 120 involved. Hardness can generally be measured by, for example, rockwell hardness test, brinell hardness test, vickers hardness test, knoop hardness test and a pencil hardness test as known to one of ordinary skill in the art. In various embodiments, the hydrophobic coating 100 can have a hardness of about 1H or higher measured by a pencil hardness test. In some cases, the hardness of the hydrophobic coating 100 can range from about 1H to about 4H, or range from about 2H to about 3H.

In various embodiments, the hydrophobic coating 100 can have an increased electrical conductivity, i.e., a reduced electrical resistivity. For example, the hydrophobic coating 100 can have a surface resistivity of less than about $10^{16}$ ohm/sq. In an additional example, the surface resistivity of the hydrophobic coating 100 can range from about $10^5$ ohm/sq to about $10^{15}$ ohm/sq, or range from about $10^7$ ohm/sq to about $10^{12}$ ohm/sq.

Figure 2:
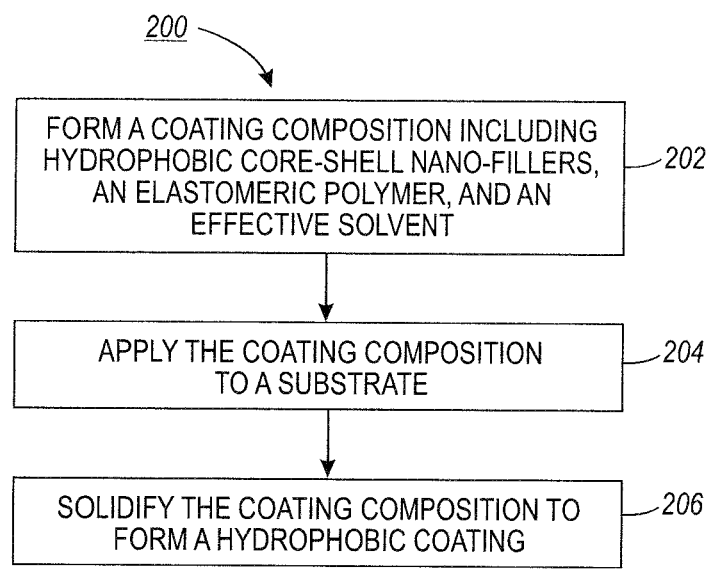
FIG. 2 is a diagram block showing an exemplary method for forming a hydrophobic coating from a coating composition in accordance with various embodiments of the present teachings.

FIG. 2 depicts an exemplary method for forming the disclosed hydrophobic coating in accordance with various embodiments of the present teachings. While the exemplary method 200 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the present teachings. In addition, not all illustrated steps may be required to implement a methodology in accordance with the present teachings.

At 202 of FIG. 2, a coating composition can be prepared to include an effective solvent, in order to disperse the hydrophobic core-shell nano-fillers, one or more elastomeric polymers and/or corresponding curing agents; and optionally, inorganic filler particles or surfactants that are known to one of the ordinary skill in the art.

The effective solvents can include water or organic solvents including, but not limited to, methyl isobutyl ketone (MIBK), acetone, methyl ethyl ketone (MEK), and mixtures thereof. Other solvents that can form suitable dispersions can be within the scope of the embodiments herein.

In a certain embodiment, the coating composition can include the disclosed hydrophobic core-shell nano-fillers, fluoroelastomers such as VITON® as well as related curing agents such as a bisphenol curing agent VC-50, and, optionally, inorganic fillers such as MgO in an organic solvent such as MIBK.

At 204 of FIG. 2, the coating composition can be applied to a substrate. Various coating techniques can be used to apply the coating composition onto the substrate. As used herein, the term "coating technique" refers to a technique or a process for applying, forming, or depositing a dispersion or a coating composition to a material or a surface. Therefore, the term "coating" or "coating technique" is not particularly limited, and dip coating, painting, brush coating, roller coating, pad application, spray coating, spin coating, casting, ring coating, molding coating, extrusion coating or flow coating can be employed. For example, gap coating can be used to coat a flat substrate, such as a belt or plate, whereas flow coating can be used to coat a cylindrical substrate, such as a drum or a roll. Coated articles can then be formed having various configurations.

In various embodiments, the substrate used for the coating process can include a wide variety of materials, such as, for example, metals, metal alloys, rubbers, glass, ceramics, plastics, or fabrics. In an additional example, the metals used can include aluminum, anodized aluminum, steel, nickel, copper, and mixtures thereof, while the plastics used can include polyimide, polyester, polyetheretherketone (PEEK), poly (arylene ether), polyamide and mixtures thereof.

At 206 of FIG. 2, following application of coating composition on the substrate, the applied coating composition can be solidified, e.g., at elevated temperatures ranging from about 150° C. to about 300° C. For example, the solidification process can include a drying process, and/or, in some cases, a curing process to form the hydrophobic coating.

In some embodiments, the effective solvent of the applied coating composition can be partially or wholly evaporated prior to the curing process. For example, the solvent can first be allowed to evaporate for about two hours or longer at a room temperature. Other evaporation times and temperatures can be within the scope of embodiments herein. Following evaporation, the coating composition can be cured.

In various embodiments, the curing process can be determined by the polymer(s) and the curing agent(s) used and can include, for example, a step-wise curing process. An exemplary curing process can be a step-wise cure at low temperatures, for example, about 260° C. or lower. In an exemplary embodiment, a coated coating composition can be placed in a convection oven at about 149° C. for about 2 hours; the temperature can be increased to about 177° C. and further curing can take place for about 2 hours; the temperature can be increased to about 204° C. and the coating can further be cured at that temperature for about 2 hours; lastly, the oven temperature can be increased to about 232° C. and the coating can be cured for another 6 hours. Other curing schedules can be possible. Curing schedules known to those skilled in the art can be within the scope of embodiments herein.

In various embodiments, the substrate used for the coating process may or may not be removed after the final formation of the hydrophobic coating.

The following examples are illustrative of the present teachings and their advantageous properties, and are not to be taken as limiting the disclosure or claims in any way.

EXAMPLES

Example 1

Preparation of Hydrophobic Coating Compositions and Hydrophobic Coatings

Coating compositions were prepared by milling core-shell filler VP STX801 (B.E.T. surface area=40-70 $m^2/g$), commercially available from EVONIK Industries, and VITON GF® along with bisphenol curing agent VC50 (VITON® Curative No. 50 available from E.I. du Pont de Nemours, Inc., Wilmington, Del.) about 2% of VITON GF® in an organic solvent of methyl isobutyl ketone (MIBK) using 2-mm stainless shots at 200 rpm for 18 hours. Various weight loadings were used for the polymer VITON GF® and the core-shell fillers of the coating compositions.

After filtration through a 20 μm nylon cloth, uniform nano-coating compositions were obtained and then coated on exemplary aluminum drums via a ring coating process.

Following the coating process of the coating composition, a curing process was performed at ramp temperatures of about 49° C. for about 2 hours, and at about 177° C. for about 2 hours, then at about 204° C. for about 2 hours and then at about 232° C. for about 6 hours for a post cure. As a result, a 20 μm-thick nano-composite film coating was obtained for each coating composition.

For comparison, a VITON GF® only coating was also similarly prepared without the incorporation of core-shell filler VP STX801.

Example 2

Properties of Hydrophobic Coatings

Table 1 compares water contact angle and surface resistivity of VITON® polymer free of core-shell fillers and composite materials that include VITON® polymer (70% or 60% by weight) and core-shell filler VP STX801 (30% or 40% by weight).

Water contact angles were measured at an ambient temperature of about 23° C., using deionized water, and by the instrument of Contact Angle System OCA (model OCA15, Dataphysics Instruments GmbH, Filderstadt, Germany). At least ten measurements were performed and averaged, as shown in Table 1.

Surface resistivities were measured at a temperature of about 23° C. with an ambient humidity of about 65 percent. Four to six measurements were performed at various spots of each formed composite coating material using a High Resistivity Meter (Hiresta-Up MCP-HT450 from Mitsubishi Chemical Corp., Japan). Averaged results are shown in Table 1.

TABLE 1

|  | VITON ® | VITON ® + VP STX801 (70% + 30%) | VITON ® + VP STX801 (60% + 40%) |
| --- | --- | --- | --- |
| Contact angle | 103.8° | 142.7° | 148.3° |
| Surface resistivity (ohm/sq) | ~$10^{16}$ | $4.29 \times 10^{11}$ | $6.32 \times 10^{9}$ |

As shown, incorporation of the hydrophobic core-shell nano-fillers increased the contact angle of the resulting coating material. In addition, the coating composite materials containing VITON®/core-shell nano-filler were more conductive than the VITON® only coating material. As an example, the resulting coating material containing 40% nano-fillers possessed a contact angle approaching 150° and a surface resistivity of more than about $10^9$ ohm/sq.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes" "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A hydrophobic coating comprising:
    a polymer matrix comprising an elastomeric polymer, wherein the elastomeric polymer comprises a fluoroelastomer, a polyperfluoroether elastomer, a silicone elastomer or a combination thereof; and
    a plurality of nano-fillers dispersed within the polymer matrix, wherein each nano-filler comprises a core-shell structure of a silica shell over a metal oxide core, the silica shell comprising a hydrophobic moiety, the metal oxide core comprising titanium oxide, and each nano-filler has an average particle diameter from about 1 nm to about 100 nm, and about 70 wt % to about 90 wt % metal oxide core, and
    wherein the hydrophobic coating comprises the plurality of nano-fillers at about 3% to about 6% by weight of the hydrophobic coating.

2. The hydrophobic coating of claim 1, wherein the elastomeric polymer further comprises a thermoelastomer.

3. The hydrophobic coating of claim 1, wherein the elastomeric polymer comprises a cure site monomer and a fluoroelastomer comprising a monomeric repeat unit selected from the group consisting of a vinylidene fluoride, a hexafluoropropylene, a tetrafluoroethylene, a perfluoro(methyl vinyl ether), a perfluoro(propyl vinyl ether), a perfluoro (ethyl vinyl ether), and mixtures thereof.

4. The hydrophobic coating of claim 1, wherein the elastomeric polymer comprises a vinylidene fluoride-containing fluoroelastomer cross-linked with an effective curing agent selected from the group consisting of a bisphenol compound, a diamino compound, an aminophenol compound, an aminosiloxane compound, an amino-silane, a phenol-silane compound and combinations thereof.

5. The hydrophobic coating of claim 1, wherein the hydrophobic moiety of the silicon shell is selected from the group consisting of silazane, fluorosilane, polysiloxane, alkyl, and combinations thereof.

6. The hydrophobic coating of claim 5, wherein
    the silazane is selected from the group consisting of 1,1,1-trimethyl-N-(trimethylsilyl)-silanamine (hexamethyldisilazane), 2,2,4,4,6,6-hexamethylcyclotrisilazane, 1,3-diethyl-1,1,3,3-tetramethyldisilazane, 1,1,3,3-tetramethyl-1,3-diphenyldisilazane, 1,3-dimethyl-1,1,3,3-tetraphenyldisilazane, and mixtures thereof;
    the fluorosilane is $C_6F_{13}CH_2CH_2OSi(OCH_3)_3$;
    the polysiloxane is selected from the group consisting of 2,4,6,8-tetramethylcyclotetrasiloxane, 2,4,6,8,10-pentamethylcyclopentasiloxane, octamethylcyclotetrasiloxane, decamethylcyclopentasiloxane, 2,4,6-trimethyl-2,4,6-triphenylcyclotrisiloxane, hexaphenylcyclotrisiloxane, octaphenylcyclotetrasiloxane, and mixtures thereof; and
    the alkyl has from about 1 to about 18 carbon atoms.

7. The hydrophobic coating of claim 1, wherein the silica shell comprises a material selected from the group consisting of silica ($SiO_2$), silicone ($R_2SiO$), polyhedral oligomeric silsequioxane (POSS, $RSiO_{1.5}$), and combinations thereof, wherein R is an alkyl having from about 1 to about 18 carbon atoms, an aryl having from about 6 to about 24 carbon atoms, or combinations thereof.

8. The hydrophobic coating of claim 1, wherein the metal oxide core further comprises a metal oxide selected from the group consisting of tin oxide, antimony-doped tin oxide, indium oxide, indium-doped tin oxide, zinc oxide, and combinations thereof.

9. The hydrophobic coating of claim 1, wherein the hydrophobic coating comprises the plurality of nano-fillers at 40% to about 60% by weight of the hydrophobic coating.

10. The hydrophobic coating of claim 1, wherein the plurality of nano-fillers comprises nanospheres, nanotubes, nanofibers, nanoshafts, nanopillars, nanowires, nanorods, nanoneedles, nanofibers, nanowhiskers, or mixtures thereof.

11. The hydrophobic coating of claim 1, further comprising a coating surface having a water contact angle of at least about 105 degrees.

12. The hydrophobic coating of claim 1, further comprising a surface resistivity ranging from about $10^5$ ohm/sq to about $10^{15}$ ohm/sq.

13. The hydrophobic coating of claim 1, wherein the coating has a mechanical hardness ranging from about 1H to about 4H measured by a pencil hardness test.

14. A super-hydrophobic coating comprising:
a fluoroelastomer matrix comprising one or more fluoroelastomers; and
a plurality of nano-fillers dispersed within the fluoroelastomer matrix in an amount to render the fluoroelastomer matrix super-hydrophobic, wherein each nano-filler comprises a core-shell structure of a silica shell over a metal oxide core, the silica shell comprising a hydrophobic moiety, the metal oxide core comprises titanium oxide, and each nano-filler has an average particle diameter from about 1 nm to about 100 nm, and about 70 wt % to about 90 wt % metal oxide core, and
wherein the super-hydrophobic coating comprises the plurality of nano-fillers at about 30% to about 60% by weight of the super-hydrophobic coating.

15. The super-hydrophobic coating of claim 14, wherein the super-hydrophobic coating comprises the plurality of nano-fillers at 40% to about 60% by weight of the super-hydrophobic coating.

16. The super-hydrophobic coating of claim 14, wherein the hydrophobic moiety of the silicon shell is selected from the group consisting of silazane, fluorosilane, polysiloxane, alkyl, and combinations thereof.

17. The super-hydrophobic coating of claim 14, further comprising a coating surface having a water contact angle of at least about 150 degrees.

18. The super-hydrophobic coating of claim 14, wherein the fluoroelastomer matrix comprises a cure site monomer and a material selected from the group consisting of i) copolymers of vinylidene fluoride and hexafluoropropylene; ii) terpolymers of vinylidene fluoride, hexafluoropropylene and tetrafluoroethylene; and iii) tetrapolymers of vinylidene fluoride, hexafluoropropylene, tetrafluoroethylene and a cure site monomer.

19. A method for making a coating material comprising:
providing a substrate;
forming a coating composition comprising an elastomeric polymer and a plurality of nano-fillers in an organic solvent, wherein each nano-filler comprises a silica shell over a metal oxide core, the silica shell comprising a hydrophobic moiety, the metal oxide core comprising titanium oxide, and each nano-filler has an average particle diameter from about 1 nm to about 100 nm, and about 70 wt % to about 90 wt % metal oxide core;
applying the coating composition to the substrate; and
solidifying the applied coating composition to form a hydrophobic coating comprising the plurality of nano-fillers at about 3% to about 6% by weight of the hydrophobic coating.

20. The method of claim 19, wherein the substrate is a cylinder, a roller, a belt, a plate, a film, a sheet, a drum, or and a drelt and is formed of a material selected from the group consisting of a metal, a plastic, and a ceramic,
wherein the metal comprises a material selected from the group consisting of an aluminum, an anodized aluminum, a steel, a nickel, a copper, and mixtures thereof, and
wherein the plastic comprises a material selected from the group consisting of a polyimide, a polyester, a polyetheretherketone (PEEK), a poly(arylene ether), a polyamide, and mixtures thereof.

\* \* \* \* \*